Sept. 7, 1965　　　T. H. HOLMES　　　3,204,402
STEP FUNCTION THRUST CONTROL
Filed Nov. 16, 1960　　　3 Sheets-Sheet 2

INVENTOR
TRENT H. HOLMES
BY David S. Fishman
AGENT

Sept. 7, 1965  T. H. HOLMES  3,204,402
STEP FUNCTION THRUST CONTROL
Filed Nov. 16, 1960  3 Sheets-Sheet 3

INVENTOR
TRENT H. HOLMES
BY David S. Fishman
AGENT

United States Patent Office 3,204,402
Patented Sept. 7, 1965

3,204,402
STEP FUNCTION THRUST CONTROL
Trent H. Holmes, Rocky Hill, Conn., assignor to United Aircraft Corporation, East Hartford, Conn., a corporation of Delaware
Filed Nov. 16, 1960, Ser. No. 69,771
17 Claims. (Cl. 60—35.6)

This application is a continuation-in-part of the United States application Serial No. 822,688 filed June 24, 1959, now Patent No. 3,161,017.

This invention relates to a liquid rocket engine and more particularly to a novel thrust and combustion chamber pressure control for a liquid rocket engine.

The thrust generated by a rocket engine is directly related to the combustion pressure of the engine, and combustion chamber pressure is a function of the amounts of propellants delivered to the combustion chamber. Combustion chamber pressure is a critical quantity and must be prevented from exceeding a predetermined maximum value for a variety of reasons. For example, the combustion chamber pressure must be controlled so that the correct thrust is generated to properly fulfill the mission of the rocket. Also, the structural characteristics of the material of which the combustion chamber is constructed require that the combustion chamber pressure be controlled to avoid overstressing of the walls of the combustion chamber.

The present invention is contemplated for use in a pump-fed liquid rocket system wherein the pumps are driven by a turbine which uses one of the propellants as a motor fluid for the turbine, the propellant being placed in heat exchange relationship with the combustion chamber prior to being diverted to the turbine, and where the control is designed for point operation to maintain one steady state operating condition. Ordinarily, the pumps are allowed to accelerate freely from the start of the engine until the operating levels of the thrust and combustion chamber pressure are reached. The control then becomes effective to maintain the engine at its operating level by regulating the output from the pumps, and thereby controlling combustion chamber pressure and thrust. However, as the engine nears the operating condition there is a tendency for thrust and combustion chamber pressure to seriously exceed the predetermined operating level before the control system becomes effective. And, as a result, the control acts to momentarily reduce combustion chamber pressure and thrust below the operating level, and several such oscillations above and below the operating condition may occur before steady state operation is reached. This condition seriously impairs the performance of the rocket, and the elimination or minimization of this condition will significantly improve engine performance. The present invention operates to that end by modifying the acceleration of the pumps and the attendant increases in combustion chamber pressure and thrust prior to reaching the operating condition, and then further modulation of pump output occurs to maintain the desired operating condition.

Accordingly one feature of this invention is a novel thrust control which controls combustion chamber pressure over two ranges of combustion chamber pressure.

Another feature of this invention is a novel thrust control for controlling combustion chamber pressure over two ranges of combustion chamber pressure in which the controlling element over the first range is rendered inoperative upon exceeding the upper limit of the first range.

Still another feature of this invention is a novel thrust control for controlling combustion chamber pressure over two ranges of combustion chamber pressure in which the controlling element over the second range is automatically rendered operative by rendering inoperative the first range controlling element.

Still another feature is a novel thrust control for controlling combustion chamber pressure over two ranges of combustion chamber pressure in which fuel is bypassed around a propellant driven turbine which drives the propellant pumps, with a first amount of bypassing occurring over a first range of combustion chamber pressure and a second amount of bypassing occurring over a second range of combustion chamber pressure.

Other features and advantages will be apparent from the specification and claims and from the accompanying drawings which illustrate an embodiment of the invention.

Figure 1:
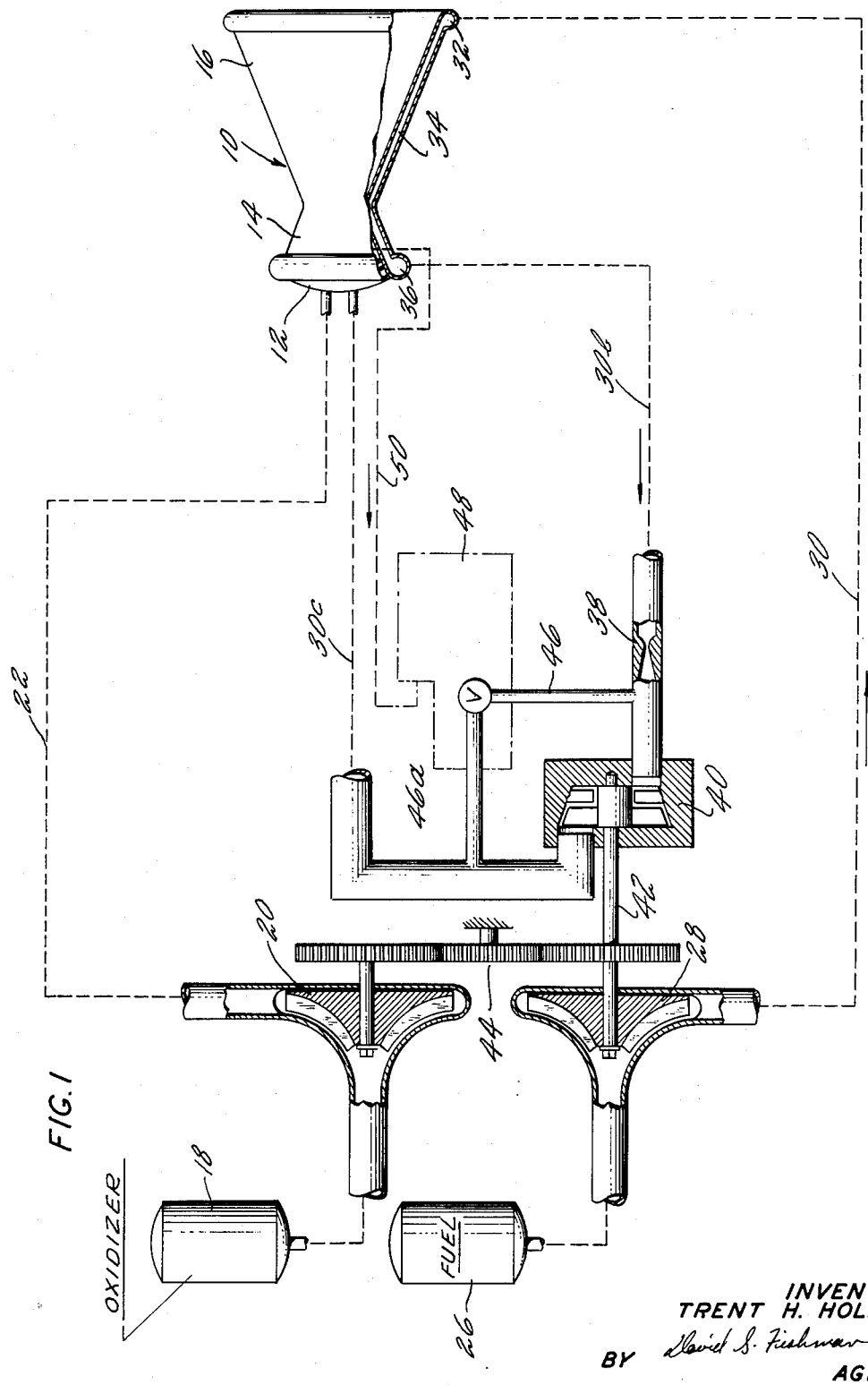
FIG. 1 is a schematic representation of a liquid rocket system utilizing the present invention.

Referring to FIG. 1, the liquid rocket engine 10 has a propellant injector head 12, a combustion chamber 14, and a thrust nozzle 16. Engine 10 preferably uses cryogenic liquids such as hydrogen and oxygen for propellants. Oxidizer is stored in tank 18 and pumped to combustion chamber 14 by oxidizer pump 20 through line 22.

Fuel is stored in tank 26 and is delivered by pump 28 through line 30 to a manifold 32 at the discharge end of the thrust nozzle 16. The fuel then is heated by passing through jacket 34 which is in heat exchange relationship with combustion chamber 14, and is then collected in manifold 36. The fuel then passes in gaseous form through portion 30b of the fuel conduit which includes venturi 38, is expanded through turbine 40 and thence through fuel conduit 30c to combustion chamber 14. Turbine 40 is drivingly connected to fuel pump 28 by shaft 42 and through gear train 44 to oxidizer pump 20 to drive both pumps at speeds which will provide fuel and oxidizer to combustion chamber 14 at the desired fuel-oxidizer ratio for combustion.

A bypass consisting of lines 46 and 46a extends between portions 30b and 30c of the fuel conduit and constitutes a bypass around turbine 40. Thrust control 48 performs the function of regulating the amount of fuel through bypass lines 46, 46a and hence regulates the speed of turbine 40 and thus the speed of pumps 20 and 28 and the amount of propellants which are delivered to the combustion chamber 14. Control 48 operates as a function of combustion chamber pressure which is sensed through line 50.

Figure 2:
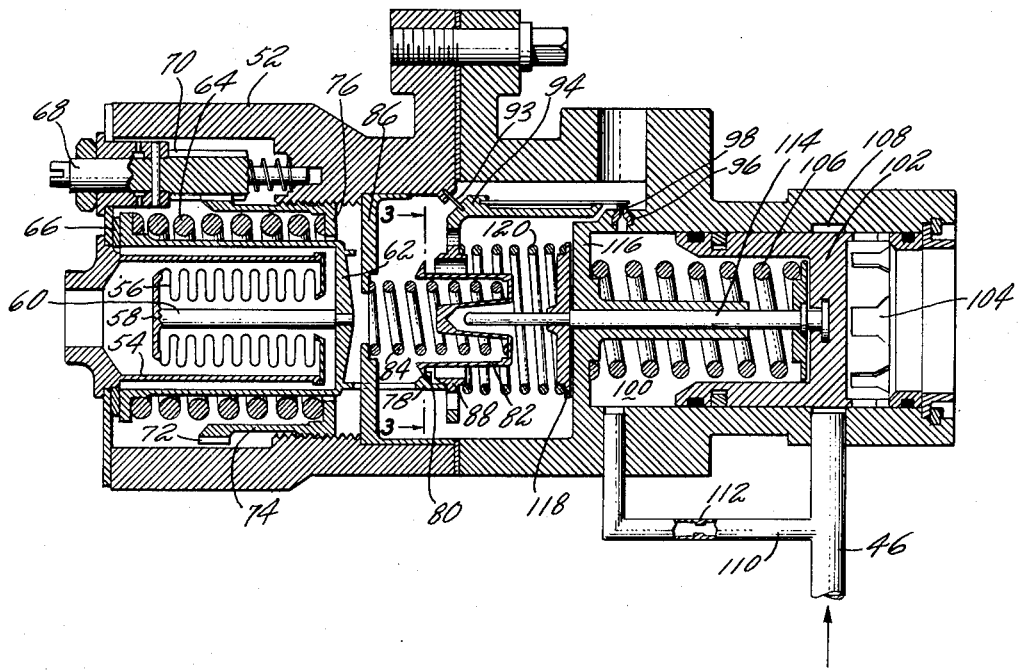
FIG. 2 is an enlarged cross-sectional view of the thrust control of FIG. 1.

Referring now to FIG. 2, thrust control 48 includes a casing 52 having mounted therein a sleeve 54. A bellows 56 is supported by sleeve 54. Extending from an end plate 58 of bellows 56 is a rod 60 which is connected to a yoke 62. A spring 64 urges yoke 62 against a stop 66 and the force exerted by spring 64 can be adjusted by a screw 68 which has a worm gear 70 mounted thereon. Worm gear 70 meshes with a gear 72 mounted on a sleeve 74 which is threadably connected to casing 52 and which has a flange 76 against which spring 64 abuts.

Figure 3:
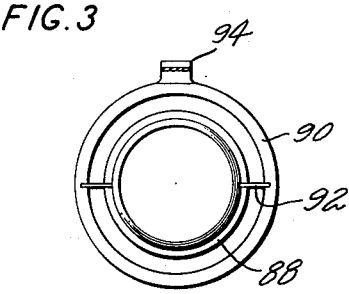
FIG. 3 is a view taken along line 3—3 of FIG. 2.

A finger 78 having a protrusion 80 thereon extends from yoke 62. A yoke 82 contacts protrusion 80 and a spring 84 extends between an annular member 86 and yoke 82 to load yoke 62 in a direction opposed to the load imposed on yoke 62 by spring 64. The end of finger 78 contacts a ring 88, and as can best be seen in FIG. 3, ring 88 is connected to ring 90 by finger springs 92.

A flapper arm 94 extends from ring 90 and is mounted on casing 52 by means of pivot 93. The end of arm 94 cooperates with a nozzle 96 and acts as a flapper valve to vary the area of orifice 98.

Nozzle 96 communicates with a chamber 100 in casing 52 to control the pressure in the chamber. A slideable valve 102 having window ports 104 therein is mounted in chamber 100 and is urged to the right by spring 106. Window ports 104 are designed to communicate with annular chamber 108 which is connected to line 46 and creates a variable restriction between lines 46 and 46a. A line 110 having a fixed restriction 112 therein branches off from line 46 and communicates with chamber 100. A rod 114 which is attached to valve 102 and extends through the closed end 116 of chamber 100 is disposed to contact yoke 82 upon a predetermined movement of valve 102. A plate 118 is attached to rod 114 on the side of closure 116 removed from chamber 100, and a spring 120 extends between plate 118 and ring 88.

*Operation*

Immediately upon the starting of engine 10, the speed of pumps 20 and 28, the combustion chamber pressure, and the thrust will start rising to their steady state operation levels. Valve 102 will initially be in the extreme right position and there will be no communication between window ports 104 and annular chamber 108. Flapper arm 94 will close orifice 98 and valve 102 will be urged to the right and held closed by the force of spring 106 and the pressure of the fuel delivered to chamber 100 via lines 46 and 110 while the pressure downstream of turbine 40 will be imposed on valve 102 through line 46a to load valve 102 toward the left. While valve 102 remains in its extreme right position, pumps 20 and 28 will be freely and continuously accelerating due to the fact that increasing amounts of propellants will be delivered to combustion chamber 14 to raise the combustion chamber temperature and hence a constantly increasing amount of energy will be transferred to the fuel in jacket 34 which is used to power turbine 40. Combustion chamber pressure and engine thrust will also be increasing accordingly.

If no control is exercised over pump speed until pump speed approaches the steady state operating condition, pump speed and hence combustion chamber pressure and thrust will exceed the steady state operating condition and the control will operate to cause serious oscillations of these quantities above and below the steady state operating condition. A graphic representation of these oscillations is shown by the dotted lines of FIG. 4. The present invention operates to eliminate this undesirable condition in the following manner. Combustion chamber pressure is delivered to the exterior of bellows 56 via line 50 and imposes a force on plate 58, which force is transmitted to yoke 62 by rod 60 to urge yoke 62 to the right. A load representative of the desired steady state combustion chamber pressure is imposed on yoke 62 through spring 64 to urge yoke 62 to the left. The force of spring 84 is transmitted to yoke 82 and then through finger 78 to yoke 62 to urge yoke 62 to the right. Thus it can be seen that there is a net force on yoke 62 equal to the difference between the forces of spring 64 and spring 84 urging yoke 62 to the left. When the combustion chamber pressure reaches a first predetermined level, the force on plate 58 will overcome the load imposed on yoke 62 by the difference in forces of springs 64 and 84, and yoke 62 will move to the right. This movement of yoke 62 is transmitted through finger 78 to ring 88 and thence to ring 90 through spring 92 to pivot flapper arm 94 in a counterclockwise direction. Movement of flapper arm 94 establishes an area of orifice 98 and reduces the pressure in chamber 100. The turbine discharge pressure load imposed on valve 102 through line 46a is then sufficient to overcome the rightward load on valve 102 and move valve 102 to the left thereby bringing window ports 104 into communication with annular chamber 108 to bypass fluid around turbine 40 thereby trimming or regulating the rate of increase of the speed of pumps 20 and 28 and hence trimming or regulating the rate of increase of combustion chamber pressure and thrust. The movement of valve 102 to the left compresses spring 120 and imposes an increased load on ring 88 thereby incorporating a droop characteristic to regulate the opening of valve 102 over a first range of combustion chamber pressures.

Pump speed, combustion chamber pressure, and engine thrust are all increasing rapidly until bypass valve 102 starts to open at the first predetermined combustion chamber pressure. The initial opening of bypass valve 102 does not establish constant operating values of pump speed, combustion chamber pressure and engine thrust; rather, these parameters continue to increase at reduced rates above their levels at the initial opening of bypass valve 102 while bypass valve 102 continues to open and bypass increasing amounts of fluid around turbine 40.

As combustion chamber pressure rises above the first predetermined level, the area of orifice 98 will be further enlarged to further reduce the pressure in chamber 100, and valve 102 will continue its leftward movement until rod 114 contacts yoke 82 and lifts yoke 82 off of protrusion 80. This removes the rightward load of spring 84 from yoke 62 and the force of spring 64 will then be sufficient to overcome the load on plate 58 and yoke 62 will move slightly to the left. However, the slight leftward movement of yoke 62 will result in a clockwise rotation of flapper arm 94 to decrease the area of orifice 98 and thus increase the pressure in chamber 100 thereby moving valve 102 slightly to the right. This slight movement of valve 102 will disengage rod 114 from yoke 82 and yoke 82 will again come in contact with protrusion 80 thereby reimposing the rightward load of spring 84 on yoke 62. The load on plate 58 will then again be sufficient to cause counterclockwise rotation of flapper arm 94 to reduce the pressure in chamber 100. Thus it will be apparent that after rod 114 has initially come in contact with yoke 82, the above described series of events will be constantly repeated with the result that the control reaches a temporarily substantially fixed state wherein a constant area of bypass valve 102 is established in a partially open position of the valve and a constant amount of fuel is bypassed around turbine 40.

The initial opening of bypass valve 102 and the continued opening thereof until a temporarily fixed partial open condition is established constitutes a first controlling operation of the control in the nature of trimming, and the control would operate to establish the first predetermined combustion chamber pressure as the steady state operating condition if bypass valve 102 were allowed to open sufficiently and bypass enough fluid to do so. However, as explained above, bypass valve 102 is only allowed to open partially to the point where rod 114 contacts yoke 82, and the bypass capacity of valve 102 at this open position, determined by the area of ports 104 communicating with chamber 108, is not sufficient to establish the first combustion chamber pressure as the steady state level. Therefore, pump speed, combustion chamber pressure and thrust are all trimmed and continue to increase at reduced rates.

When combustion chamber pressure reaches a second predetermined level slightly below the steady state operation point, the load imposed on plate 58 will be sufficient to overcome the force of spring 64 and, therefore, the disengagement of yoke 82 from protrusion 80 will no longer cause a clockwise rotation of flapper arm 94. Hence, valve 102 will move further to the left to increase the bypass around turbine 40, the bypass capacity of valve 102 now being sufficient to bypass enough fluid to establish steady state operating conditions. The effects of spring 84 will then be entirely removed from the system, and the control will seek a balance between the force of spring 64 and the load on plate 58 to maintain the steady state operating condition. It should be apparent that the second leftward movement of valve 102 occurring at a combustion chamber pressure slightly below the steady state operating point will again impose the droop characteristic of spring 120 on the motion of flapper 94 and hence a stable control will be established to maintain the operation of the rocket engine at its predetermined steady state level.

Figure 4:
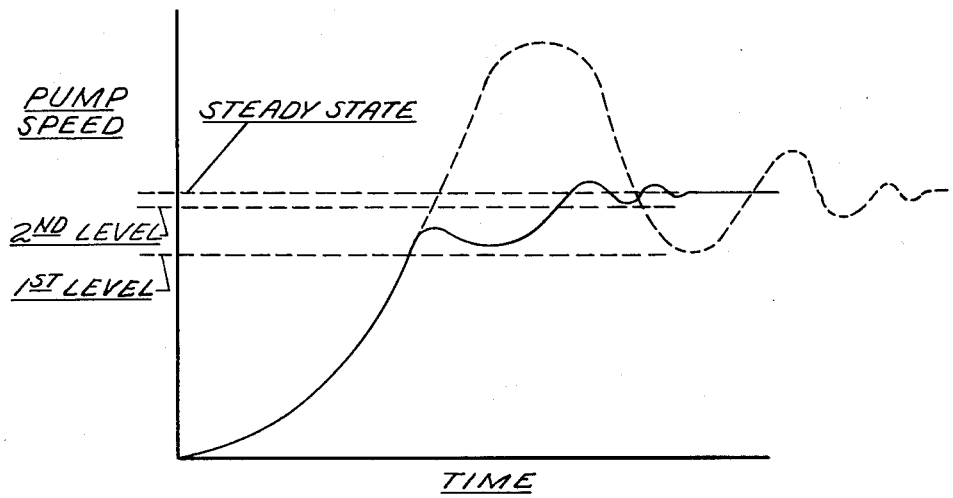
FIG. 4 is a graphic representation of an operating characteristic of a rocket engine incorporating the present invention.
Figure 5:
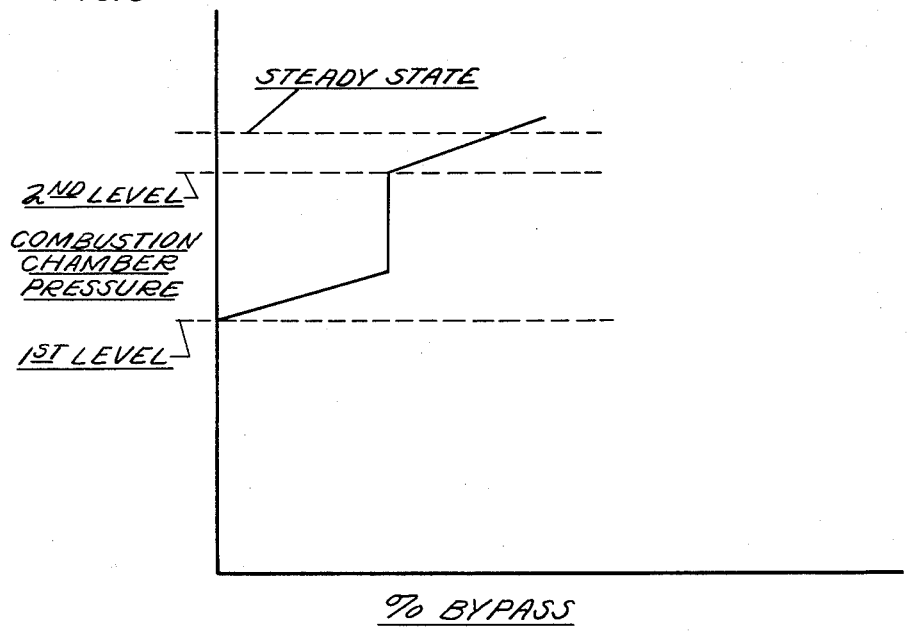
FIG. 5 is a graphic representation of another operating characteristic of a rocket engine incorporating the present invention.

Having initially reduced the rate of increase in pump speed, combustion chamber pressure and thrust at a level below the desired steady state operating condition of the rocket engine by initially partially opening the bypass valve, the control is now capable of establishing and maintaining the steady state operating condition without the serious oscillations heretofore experienced. The pump speed characteristic obtained by the present control is illustrated in FIG. 4, and FIG. 5 shows a plot of combustion chamber pressure against bypass.

It is to be understood that the invention is not limited to the specific embodiment herein illustrated and described but may be used in other ways without departure from its spirit as defined by the following claims.

I claim:

1. In a thrust control for a rocket having a combustion chamber, means for sensing combustion chamber pressure, first means actuated by said pressure sensing means in response to a first combustion chamber pressure for reducing the rate of increase of combustion chamber pressure over a first range of combustion chamber pressures, and second means actuated by said pressure responsive means in response to a second combustion chamber pressure for controlling combustion chamber pressure over a second range of combustion chamber pressures.

2. A thrust control as in claim 1 including fluid operated means, and in which the rate of increase of the flow of fluid to said fluid operated means is reduced by said first means actuated by said pressure sensing means and in which the flow of fluid to said fluid operated means is controlled by said second means actuated by said pressure responsive means.

3. A thrust control as in claim 1 including means actuated by one of said first and second means actuated by said pressure sensing means to render inoperative one of said first and second means actuated by said pressure sensing means and render operative the other of said first and second means actuated by said pressure sensing means.

4. A thrust control as in claim 1 including means actuated by said first means actuated by said pressure sensing means for rendering inoperative said first means actuated by said pressure sensing means and rendering operative said second means actuated by said pressure sensing means.

5. In a thrust control for a rocket having a combustion chamber, means for sensing combustion chamber pressure, a valve having first and second ranges of open positions, first means actuated by said pressure sensing means in response to a first combustion chamber pressure for actuating said valve within said first range of open positions, and second means actuated by said pressure sensing means in response to a second combustion chamber pressure for actuating said valve within said second range of open position.

6. A thrust control as in claim 5 including fluid operated means in fluid connection with said valve, and a fluid for operating said fluid operated means, in which the delivery of fluid to said fluid operated means is regulated by said valve.

7. A thrust control as in claim 5 including means associated with said valve for rendering inoperative said first means actuated by said pressure sensing means and rendering operative said second means actuated by said pressure sensing means.

8. In a thrust control for a liquid rocket having a combustion chamber, a pump for delivering a propellant to said combustion chamber, means for driving said pump, means for sensing combustion chamber pressure, first means actuated by said pressure sensing means in response to a first combustion chamber pressure for reducing the acceleration of said pump driving means, and second means actuated by said pressure sensing means in response to a second combustion chamber pressure for controlling said pump driving means.

9. A thrust control as in claim 8 including a fluid in heat exchange relationship with said combustion chamber, said pump driving means being operated by said fluid.

10. In a thrust control for a liquid rocket having a combustion chamber, means in heat exchange relationship with said combustion chamber, a source of propellant, and a pump for delivering said propellant to said combustion chamber, means for driving said pump, means for delivering said propellant serially to said heat exchanger and to said pump driving means to operate said pump driving means, first means responsive to a first combustion chamber pressure for reducing the rate of increase of propellant delivered to said pump driving means, and second means responsive to a second combustion chamber pressure for controlling the amount of propellant delivered to said pump driving means.

11. A thrust control as in claim 10 including a valve actuated by said first and second means responsive to said pressure sensing means for controlling the amount of propellant delivered to said pump driving means, said valve having first and second ranges of open positions, and means associated with said valve for rendering inoperative one of said first and second means responsive to said pressure sensing means and rendering operative the other of said first and second means responsive to said pressure sensing means.

12. A thrust control for a rocket engine having a combustion chamber, a source of propellant, a pump for delivering said propellant to said combustion chamber and means for driving said pump, said control including a valve for controlling said pump driving means, means for sensing combustion chamber pressure and producing a force proportional to said combustion chamber pressure, a first spring opposing said force, a second spring opposing said first spring, means for combining the force of said first and second springs and transmitting the difference in force between said first and second springs to oppose said force, means responsive to the difference between said force and the difference in force between said first and second springs to position said valve, means associated with said valve for rendering said second spring ineffective to oppose said first spring, and means responsive to the difference in force between said force and the force of said first spring to position said valve.

13. A thrust control as in claim 12 in which the pump driving means is a turbine and in which the valve controls the amount of operating fluid delivered to said turbine.

14. A thrust control as in claim 12 including means for heating said propellant by heat exchange relationship with said combustion chamber and means for delivering said heated propellant to said pump driving means to operate said pump driving means, in which said valve controls the amount of heated propellant delivered to said pump driving means.

15. A thrust control as in claim 12 including a third spring interposed between said valve and said force responsive means for positioning said valve to vary the load on said force responsive means in accordance with the position of said valve.

16. A thrust control for a rocket engine having a combustion chamber, a source of propellant, a supply conduit for delivering said propellant to said combustion chamber, said supply conduit including in successive downstream relation a pump, a heat exchanger associated with said combustion chamber and a turbine for driving said pump, said control including a valve for controlling the propellant flow from said heat exchanger to said turbine, said valve having first and second ranges of open positions, a bellows for sensing combustion chamber pressure, a first yoke attached to said bellows for transmitting a force proportional to combustion chamber pressure, said first yoke having an extension therefrom, a first spring engaging said yoke in opposition to the force proportional to combustion chamber pressure, a second spring, a second yoke associated with said second spring and engaging said extension, said second spring acting through said second yoke to transmit a force to said first yoke opposed to said first spring, a pressure load urging said valve in a closed direction, a flapper operatively connected to said extension and cooperating with an orifice to vary the area of said orifice and reduce the closing pressure load on said valve to move said valve within said first range of open positions, and an extension on said valve, said extension engaging said second yoke in the openmost of the first range of open positions of said valve to disengage said second yoke from said extension.

17. A thrust control as in claim 16 including means for delivering a portion of said propellant to one side of said valve as a servo motor fluid, the pressure of said fluid being varied by said flapper, and means for exposing the other side of said valve to the pressure of propellant discharge from said turbine.

References Cited by the Examiner

UNITED STATES PATENTS

| | | | |
|---|---|---|---|
| 2,902,824 | 9/59 | Sponzilli | 60—35.6 |
| 2,939,278 | 6/60 | Fox | 60—35.6 |
| 2,979,891 | 4/61 | Widell | 60—35.6 |

SAMUEL LEVINE, *Primary Examiner.*

SAMUEL FEINBERG, *Examiner.*